Figure 1:
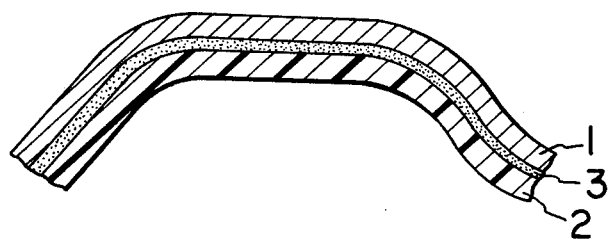

United States Patent [19]

Harada et al.

[11] 4,137,366

[45] Jan. 30, 1979

[54] INTERIOR FINISH LAMINATES COMPRISING A FOAM LAYER APPLIED THROUGH USE OF POLYAMIDE ADHESIVES

[75] Inventors: Yuichi Harada; Yoshinobu Ohya, both of Amagasaki, Japan

[73] Assignee: Daicel Ltd., Osaka, Japan

[21] Appl. No.: 756,839

[22] Filed: Jan. 5, 1977

[30] Foreign Application Priority Data

Jan. 16, 1976 [JP] Japan ................................... 51-3877

[51] Int. Cl.$^2$ ....................... B32B 5/18; B32B 17/10; B32B 27/08; B32B 27/34; B32B 31/04
[52] U.S. Cl. .................................... 428/425; 156/331; 428/474
[58] Field of Search ................. 428/474, 315, 423, 71, 428/160, 425; 156/331

[56] References Cited

U.S. PATENT DOCUMENTS

| | | | |
|---|---|---|---|
| 3,515,702 | 6/1970 | Raabe | 260/78 A |
| 3,646,154 | 2/1972 | Marans et al. | 156/331 |
| 3,883,485 | 5/1975 | Raabe et al. | 260/78 A |
| 3,883,487 | 5/1975 | Raabe et al. | 260/78 A |

FOREIGN PATENT DOCUMENTS

1374767 11/1974 United Kingdom ................... 428/474

*Primary Examiner*—J. C. Cannon
*Attorney, Agent, or Firm*—Blanchard, Flynn, Thiel, Boutell & Tanis

[57] ABSTRACT

A laminate for interior finish material comprising a frame and a covering material thermally adhered to each other with a hot melt adhesive containing a polyamide copolymer of a melting point of about 80° – 140° C., as principal component.

8 Claims, 3 Drawing Figures

INTERIOR FINISH LAMINATES COMPRISING A FOAM LAYER APPLIED THROUGH USE OF POLYAMIDE ADHESIVES

BACKGROUND OF THE INVENTION

1. FIELD OF THE INVENTION

The present invention relates to laminates for interior finish materials, i.e. laminates to be fitted to the inner walls of the ceiling, door, window frame or trunks of motorcars or to the inner walls of rooms of buildings.

2. DESCRIPTION OF PRIOR ARTS

A frame and a covering material of, for example, the ceiling of motorcar have been adhered to each other with an adhesive of the paint type. Recently, however, because of problems of public nuisance, i.e. environmental pollution and ill effects on the health of human bodies or problems of complicated steps of operation which cause prolonged operation time and poor productivity, investigations have been carried out for developing of a hot melt adhesive which does not require any solvent. The most simple method is to use a film-form hot melt adhesive. Investigations have been made on various hot melt adhesives in the form of films. Vinyl films such as ethylene/vinyl acetate copolymer resin (hereinafter referred to as EVA) and polyolefinic films such as polyethylene (hereinafter referred to as PE) have been examined. However, they were unsuitable for interior finish materials.

One requirement for the quality of interior finish materials for motorcars and buildings is that the material should pass a heat resistance test carried out at a temperature above 80° C. However, if EVA is used, the covering material comes off from the frame at a temperature above 80° C. due to the poor adhesive strength of EVA at such a high temperature. For example, in the case of a ceiling material, the covering material comes off and hangs disadvantageously.

As the covering materials used for interior finish materials, laminates of a buffer material such as foamed polyurethane or foamed polyethylene and a polyvinyl chloride sheet are used mainly. If they are subjected to thermal adhesion at a temperature above 100° C., there are posed problems such as that the covering material is spoiled by the heat. For polyolefin films such as films of said polyethylene, a sufficient adhesive strength cannot be obtained unless a higher adhesion temperature is employed than that of EVA. Consequently, the covering material is spoiled by heat and, further, a long adhesion time (usually 30–50 seconds) is required. In addition, both the workability and productivity thereof were unsatisfactory.

Thus, under the existing circumstances, no hot melt adhesive which is satisfactory with respect to both efficiency and workability has been found yet.

Recently, there has been developed a hot melt adhesive comprising a polyamide copolymer (nylon 6/66/12) of a low melting point containing lauryllactam as indispensable ingredient (for example, Japanese Patent Publication No. 22240/1970 is referred to). There has been developed further a polyamide copolymer of a low melting point comprising four kinds of monomers (for example, Japanese Patent Laid-open Application Nos. 35290/1975, 35291/1975 and 22034/1975 are referred to). However, the lowest melting points of those adhesives are around 100° C., which are substantially equal to the melting point of said polyolefinic hot melt adhesive. From this fact, it cannot be expected that those polyamide copolymers can be used suitably as interior finish materials.

Particularly, the hot melt adhesives of a low melting point containing lauryllactam or ω-aminoundecanoic acid as indispensable component are prepared for use as hot melt adhesives for fibers and fabrics. The lower the melting point, the better is the adhesive for fibers and fabrics. It could not be expected that the hot melt adhesives can be used for the adhesion of a frame to a covering material for the interior finish material of motorcars which are used under very severe conditions as in the present invention.

BRIEF DESCRIPTION OF THE ATTACHED DRAWINGS

FIG. 1 shows cross section of a motorcar interior finish material according to the present invention, wherein 1 indicates a frame, 2 indicates a covering material and 3 indicates a thermoplastic polyamide copolymer film for thermally adhering 1 to 2.

Figure 2:
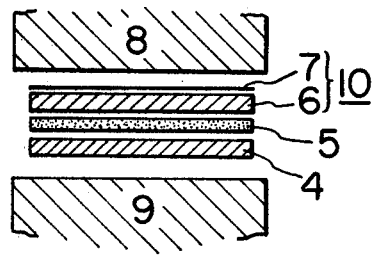
Figure 3:
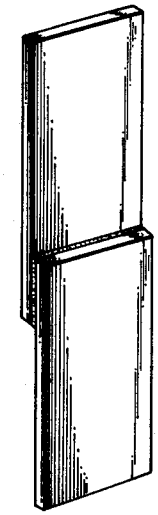

FIGS. 2 and 3 show the method of adhesion and the heat resistance test of the adhesion, respectively.

SUMMARY OF THE INVENTION

The inventors have found that among polyamide copolymers, some special copolymers of a melting point of about 80°–140° C., preferably 90°–130° C., are suitable for adhering a frame to a covering material of interior finish material and that they can be used for thermal adhesion according to either the known vacuum shaping method or the known hot press method. The present invention has been accomplished on the basis of the above findings.

The present invention relates to an interior finish material comprising a frame and a covering material adhered to each other with a hot melt adhesive containing as principal component a polyamide copolymer, a preferred polyamide copolymer being a polyamide copolymer of a melting point of about 80°–140° C., preferably 90°–130° C., comprising at least three kinds of monomers and containing as indispensable component lauryllactam or ω-aminoundecanoic acid.

A preferable example of the polyamide is a terpolymer of nylon 12 : nylon 6 : nylon 66, copolymerized in a weight ratio of 25-45:25-45:25-45.

Generally, in case a polyamide copolymer is used as a hot melt adhesive, the adhesion temperature is usually 30°–50° C. higher than the melting point of the polyamide copolymer used. In other words, for obtaining a sufficient adhesive power, it is necessary to melt the hot melt adhesive sufficiently.

After intensive investigations, the inventors have found that polyamide copolymers having certain special properties exhibit sufficient adhesive powers even at a temperature around the melting points thereof or lower temperatures. This will be understood fully from the examples given below.

The present invention will be described with reference to the attached drawings.

In an interior finish material as shown in FIG. 1, 1 indicates a frame made of, for example, glass fibers. 2 indicates a covering material such as foamed polyurethane buffer material lined with a polyvinyl chloride sheet. 3 indicates a thermoplastic polyamide copolymer film for thermally adhering 1 and 2 to each other. In an example, an interior finish material comprising a nylon 6/66/12 film (proportion: 33.3:33.3:33.3 wt. %; melting point 115° C.) as the polyamide copolymer film sandwiched between the frame 1 and the covering material 2 was heated in a heater press so that the covering material was heated to 90° C. and the frame was heated to 200° C. under a pressure of 0.5 kg/cm² for 10 seconds to effect the thermal adhesion. Substantially the highest temperature of the hot melt adhesive during the treatment was 115° C. The motorcar interior finish material thus obtained exhibited a sufficient adhesive power and no lowering of the adhesive power was recognized in a heat resistance test carried out at 80° C.

In a comparative example, the same process as in the example of the present invention was carried out using EVA film (vinyl acetate content: 18 wt. %, m.p. 96° C.) or polyethylene film (m.p. 105° C.) in place of the nylon 6/66/12 film. In case EVA film was used, the adhesive strength under normal conditions was almost satisfactory but in a heat resistance test carried out at 80° C., the adhesive power reduced gradually and it was recognized that the covering material was hung down. In case the polyethylene film was used, the adhesive strength under normal conditions was low and unsatisfactory. The same process as above was carried out using polyamide polymers containing neither lauryllactam nor ω-aminoundecanoic acid as indispensable component such as nylon 6/66/610 (CM 4,000 manufactured by Toray Industries Inc.: Trade mark) film but the results obtained were the same as that of the polyethylene film. As methods of thermal adhesion, there may be employed known methods such as vacuum forming method and hot press forming method.

The hot melt adhesive used in the present invention comprises a polyamide copolymer of a melting point of about 80°-140° C., preferably 90°-130° C. composed of at least three kinds of monomers which copolymer contains lauryllactam or ω-aminoundecanoic acid as indispensable component. Those hot melt adhesives are disclosed concretely in the specifications of Japanese Patent Publication No. 22240/1970 and Japanese Patent Laid-open Application Nos. 16599/1972, 35290/1975, 35291/1975 and 22034/1975. In carrying out the present invention, workability can be improved by incorporating further 3–15 parts by weight of EVA (vinyl acetate content: 5–20%) par 100 parts by weight of the polyamide copolymer. Though hot melt adhesives in the form of films are preferred, because they can be used easily and the operation steps can be rationalized, hot melt adhesives in other forms such as powders or nets can also be used.

As the frames used in the invention, glass fibers, resin boards, paper boards and foamed synthetic resin products are suitable.

As the covering materials used in the invention, laminates of a buffer material such as foamed polyurethane or foamed polyethylene and a polyvinyl chloride sheet, non-woven fabrics and synthetic fiber foundations are suitable. Particularly, foamed polyurethane is preferred. In addition to polyester-type resins, polyether-type resins can be also used.

The motorcar interior finish materials according to the invention are prepared by applying a hot melt adhesive to a polyurethane side of a covering material composed of a polyvinyl chloride sheet and foamed polyurethane layer or the like and thermally adhering the same to a shaped frame.

The interior finish materials according to the present invention have merits that the covering materials are not spoiled by heat, since the thermal adhesion is effected at a low temperature and that they pass a heat resistance test carried out at 80° C. Further, the thermal adhesion can be effected in a short time (for example, 5–10 seconds) and, accordingly, the operation can be rationalized to improve the productivity remarkably. Another merit of the present invention is that a satisfactory thermal adhesion can be effected even if the motorcar interior finish materials have an irregular shape (such as those of high ruggedness).

Melting points herein indicate melting maximum peak temperatures measured by using, for example, a differential calorimeter DSC-1B of Perkin Elmer Co. at an elevation rate of 10° C./min.

EXAMPLE

Films of a thickness of 50μ were prepared from nylon 6/66/12 (wt. ratio: 1:1:1) of a melting point of 115° C., nylon 66/66/610 (CM-4,000) of a melting point of 147° C., ethylene/vinyl acetate copolymer of a vinyl acetate content of 18 wt. % and a melting point of 96° C., polyethylene of a melting point of 105° C. and modified polyolefin resin (Kuranbeter of Kurashiki Boseki Co., Ltd.) of a melting point of 135° C.

By using the films, a frame and a covering material were adhered to each other to obtain the constructions of the invention as shown in FIG. 2. Between an upper hot plate 8 heated to 90° C. and a lower hot plate 9 heated to 200° C., there were inserted a covering material 10 composed of a polyvinyl chloride sheet 7 and foamed polyurethane 6, an adhesive film 5 and a frame 4. A pressure of 0.5 kg/cm² was applied thereto for 10 seconds and for 20 seconds to effect the adhesion. The samples thus adhered were subjected to adhesive strength test (180° peeling) according to the specification of JIS K 6744-71 and adhesive heat resistance test. In the latter test, as shown in FIG. 3, adhesion lapping area was 25 cm × 25 cm, a load of 250 g was applied to the sample and the sample was allowed to stand in an oven at 80° C. for 5 minutes to observe coming off (falling off) of the adhered layers. The results of the measurements are shown in the following table. In the column of heat resistance test, O indicates no falling off and X indicates falling off.

Table

| Adhesive film | Adhesion time (sec.) | Adhesive strength (kg/25 mm²) | Heat resistance test |
| --- | --- | --- | --- |
| Present invention | 10 | 1.15 | O |
|  | 20 | 2.10 | O |
| Ethylene/vinyl acetate copolymer | 10 | 0.70 | X |
|  | 20 | 1.00 | X |
| Polyethylene | 10 | 0.20 | X |
|  | 20 | 0.60 | O |
| Kuranbeter | 10 | 0.40 | X |
|  | 20 | 0.85 | O |
| CM-4,000 | 10 | 0.20 | X |
|  | 20 | 0.50 | X |

Generally, adhesives to be used for motorcar interior finish materials such as ceiling material should satisfy both adhesive strength of higher than 1.00 kg/25mm² and heat resistance test carried out at 80° C. It is evident from the test results that only the adhesive of the present invention satisfy both quality requirements. The fact that a sufficient adhesive strength can be obtained in a short adhesion time is very advantageous in view of productivity.

The embodiments of the invention in which an exclusive property or privilege is claimed are defined as follows:

1. A motorcar interior finish material comprising a frame, an adhesive film adhered to said frame, a polyurethane foam layer whose inner surface is adhered to said adhesive film and a polyvinyl chloride sheet adhered to the outer surface of said polyurethane foam layer, said adhesive film consisting essentially of a polyamide copolymer composed of at least three different polyamide-forming monomers, at least one of which is lauryl lactam or ω-aminoundecanoic acid, said polyamide copolymer having a melting point of 80° to 140° C.

2. A motorcar interior finish material according to claim 1 in which said polyamide copolymer consists of a nylon 12:nylon 6:nylon 66 copolymer copolymerized in a weight ratio of 25-45:25-45:25-45.

3. A motorcar interior finish material according to claim 1 in which said polyamide copolymer consists of a nylon 12:nylon 6:nylon 66 copolymer copolymerized in a weight ratio of 33.3:33.3:33.3.

4. A motorcar interior finish material according to claim 1, wherein the foamed polyurethane is a polyether polyurethane.

5. A motorcar interior finish material according to claim 1, wherein said polyamide copolymer has a melting point in the range between 90° and 130° C.

6. A motorcar interior finish material comprising a frame, an adhesive film adhered to said frame, a polyurethane foam layer whose inner surface is adhered to said adhesive film and a polyvinyl chloride sheet adhered to the outer surface of said polyurethane foam layer, said adhesive film consisting essentially of a blend of ethylene/vinyl acetate copolymer resin containing 5 to 20% of vinyl acetate and a polyamide copolymer composed of at least three different polyamide-forming monomers, at least one of which is lauryl lactam or ω-aminoundecanoic acid, said polyamide copolymer having a melting point of 80° to 140° C., the amount of said ethylene/vinyl acetate copolymer resin being from 3 to 15 parts by weight per 100 parts by weight of said polyamide copolymer.

7. A motorcar interior finish material according to claim 6 in which said polyamide copolymer consists of a nylon 12:nylon 6:nylon 66 copolymer copolymerized in a weight ratio of 25-45:25-45:25-45.

8. A motorcar interior finish material according to claim 6 in which said polyamide copolymer consists of a nylon 12:nylon 6:nylon 66 copolymer copolymerized in a weight ratio of 33.3:33.3:33.3.

* * * * *